(12) United States Patent
Zlojutro

(10) Patent No.: US 7,270,347 B1  
(45) Date of Patent: Sep. 18, 2007

(54) SEATBELT ATTACHMENT FOR USE BY PREGNANT WOMEN

(76) Inventor: Milan Zlojutro, P.O. Box 2385, Phoenix, AZ (US) 85007

( * ) Notice: Subject to any disclaimer, the term of this patent is extended or adjusted under 35 U.S.C. 154(b) by 0 days.

(21) Appl. No.: 11/253,821

(22) Filed: Oct. 18, 2005

(51) Int. Cl.
B60R 22/00 (2006.01)

(52) U.S. Cl. .................... 280/801.1; 297/468

(58) Field of Classification Search ............ 280/801.1; 297/464, 468, 484, 485, 465
See application file for complete search history.

(56) References Cited

U.S. PATENT DOCUMENTS

| | | | | |
|---|---|---|---|---|
| 2,195,334 A | * | 3/1940 | Lethern | 297/484 |
| 2,275,450 A | * | 3/1942 | Manson | 297/484 |
| 2,909,154 A | * | 10/1959 | Thomas | 119/771 |
| 3,052,432 A | * | 9/1962 | Martin | 297/467 |
| 3,834,758 A | * | 9/1974 | Soule | 297/484 |
| 4,205,670 A | * | 6/1980 | Owens | 128/875 |
| 4,610,463 A | | 9/1986 | Efrom | |
| 4,879,972 A | * | 11/1989 | Crowe et al. | 119/792 |
| 5,005,865 A | | 4/1991 | Kruse | |
| 5,540,403 A | * | 7/1996 | Standley | 244/122 B |
| 5,628,548 A | * | 5/1997 | Lacoste | 297/484 |
| 5,795,030 A | | 8/1998 | Becker | |
| 5,813,367 A | * | 9/1998 | O'Brien | 119/770 |
| 6,109,698 A | * | 8/2000 | Perez | 297/484 |
| 6,309,024 B1 | * | 10/2001 | Busch | 297/484 |
| 6,322,150 B1 | | 11/2001 | Harper et al. | |
| D483,548 S | * | 12/2003 | Chambers | D2/627 |
| 6,935,700 B1 | * | 8/2005 | Nerette | 297/467 |
| 2003/0015905 A1 | * | 1/2003 | Sappei et al. | 297/468 |
| 2004/0169411 A1 | * | 9/2004 | Murray | 297/486 |

* cited by examiner

*Primary Examiner*—Faye M. Fleming  
(74) *Attorney, Agent, or Firm*—Gregory J. Nelson

(57) ABSTRACT

A positioning attachment for vehicle seatbelts primarily for use by pregnant women. The attachment has an anchor portion securable to the vehicle seat or seat support and an attachment portion adjustably securable to the vehicle lap belt to position the lap belt in a lowered position extending below the abdomen of the wearer to secure the wearer in the pelvic area.

2 Claims, 2 Drawing Sheets

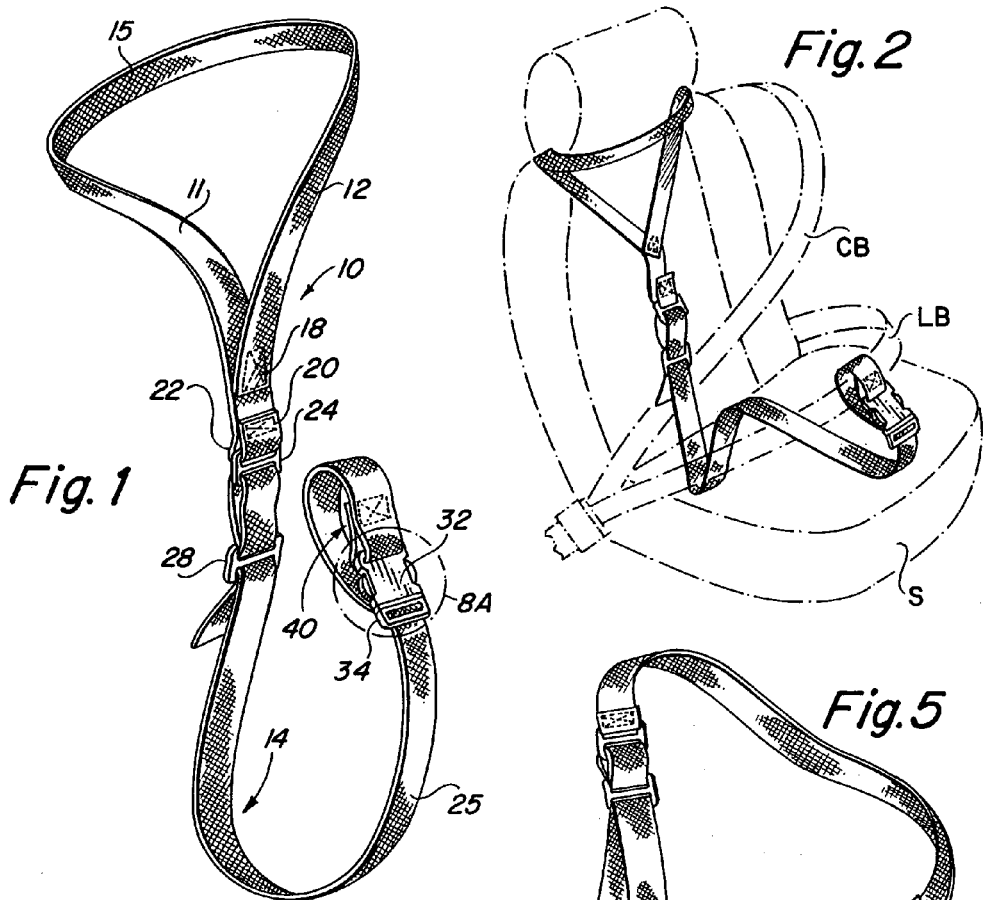
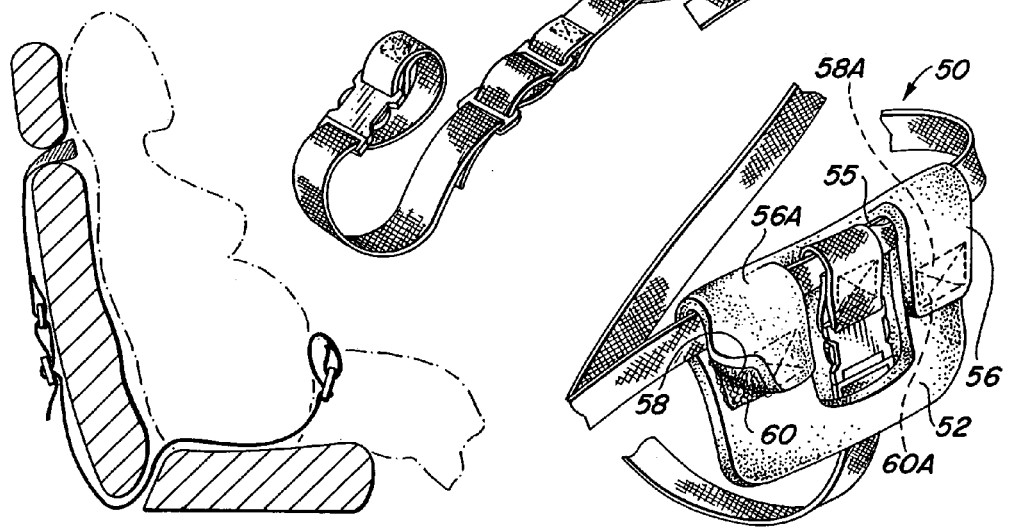

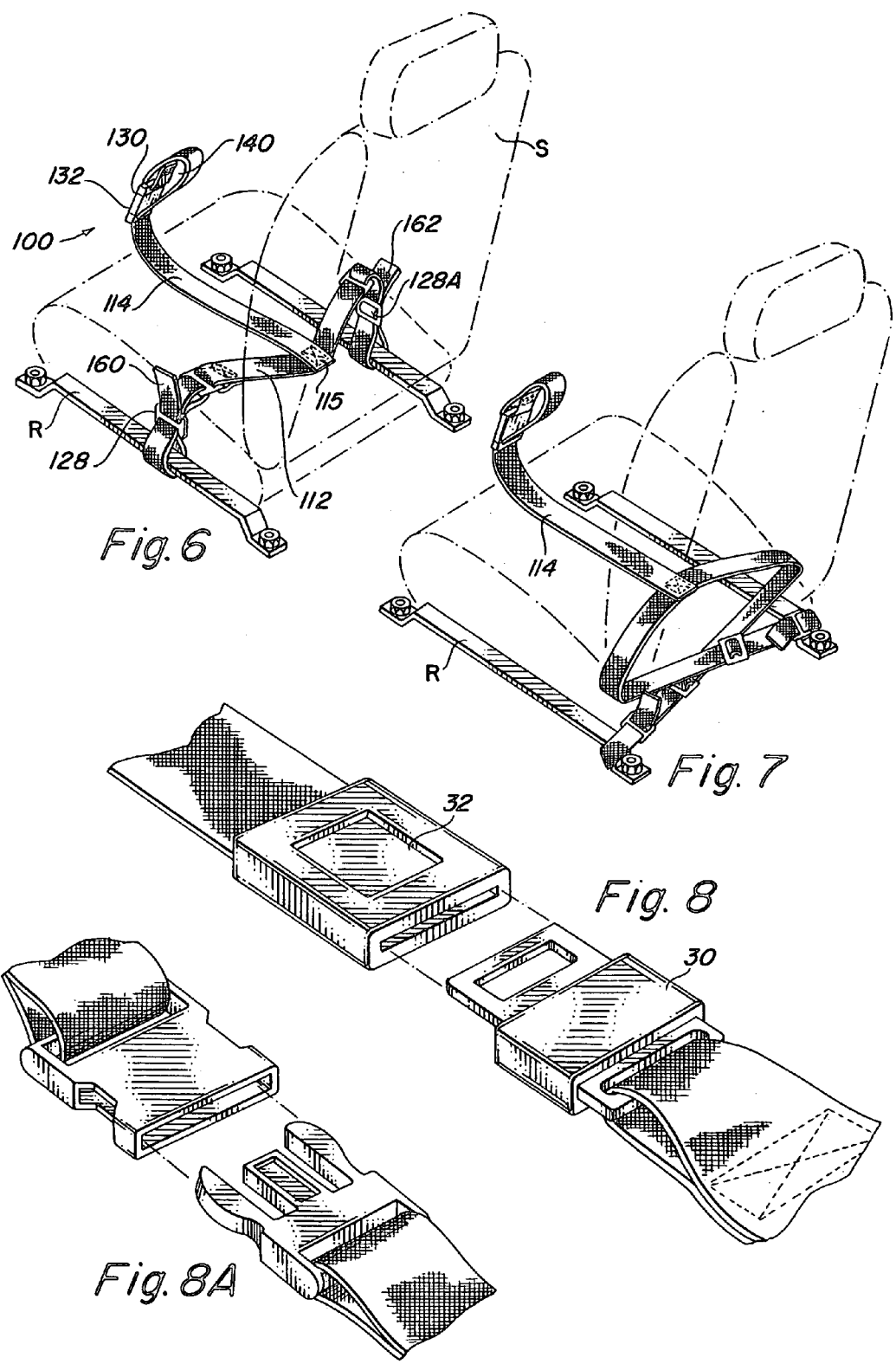

SEATBELT ATTACHMENT FOR USE BY PREGNANT WOMEN

FIELD OF THE INVENTION

The present invention generally relates to a vehicle seatbelt accessory for seatbelts of the type which generally include a lap belt and a diagonally extending shoulder strap. The invention more particularly relates to a positioning attachment which positions and maintains the lap belt below the enlarged abdomen of pregnant women and over the pelvis for increased comfort and safety.

BACKGROUND OF THE INVENTION

Current motor vehicles are required by law to have seatbelts. Conventional belts include a lower belt, designated lap belt, which extends across the abdomen of the user. A shoulder strap extends across the user's upper body and over one shoulder to restrain forward movement of the driver or passenger in the event of a collision. When using conventional seatbelts of the type described above, pregnant women may encounter certain difficulties and discomfort. Normally, pregnant women should avoid placing the lap belt across the abdomen. It is normally recommended that the lap belt be worn in a low position across the pelvis and below the abdomen. However, during normal usage or in the unfortunate event of a collision, the lap belt may tend to creep upwardly with the result that pressure is applied to the abdominal area of the women. This may result in injury to the unborn child, as well as to the mother.

There are various attempts in the prior art to provide seatbelt apparatus for use by pregnant women which avoid the application of forces to the abdominal area. Many of these devices found in the prior art are either complex or require extensive modification or, perhaps, removal of the existing belt and reinstallation of a new belt system.

U.S. Pat. No. 5,795,030 shows a seatbelt pad with a padded area for abdominal support. The vehicle seatbelts can be clipped to fittings on the pad. The pad, which is larger than an ordinary seatbelt, protects the user's abdomen.

U.S. Pat. No. 4,610,463 discloses a protector for the abdominal area in the form of a shield which is configured overlying at least partially surrounding the abdominal area. The casing is spaced from the abdominal area so when any force is exerted thereon, the forces are absorbed by the casing and transferred to the seat or the supporting structure and not to the abdominal area.

U.S. Pat. No. 6,322,150 relates to a seatbelt lap pillow for use by a pregnant woman. The device attaches to the lap belt portion of the vehicle and has a cushioning element attached at the upper edge for padding the upper edge of the seatbelt.

U.S. Pat. No. 5,005,865 discloses a seatbelt positioning assembly which has a seat pad adapted to be positioned on the seat of the automobile and secured to the seat by a securing strap. A sleeve is removably fitted along a portion or length of the seatbelt. A pair of positioning straps are connected to and extend from the seat and attach to the bottom edges of the sleeves so as to pull the sleeve and the attached seatbelt downwardly along the lower abdominal region.

BRIEF SUMMARY OF THE INVENTION

Briefly, the present invention provides a positioning attachment for use with a conventional seatbelt. The attachment has an anchor portion which may be in the form of a loop extendable about the headrest and downwardly along the rear of the seat. An attachment portion is adjustably securable to the anchor portion and has a strap which extends through the area between the backrest seat cushion and the seat portion. The end of the attachment portion has an adjustable loop which is securable about the seatbelt so the user may adjust the positioning attachment to maintain the lap belt in a comfortable position across the pelvis and below the abdomen.

In another embodiment, the anchor portion of the positioning attachment may secured to supporting structures such as the rails to which the vehicle seat is anchored. The lower attachment portion extends forwardly from the anchor portion and terminates at an adjustable loop securable to the lap belt of the user.

In yet another embodiment, a cushioning pad may be detachably secured over the lap belt at the point of attachment of the positioning attachment to the lap belt to provide cushioning.

BRIEF DESCRIPTION OF THE DRAWINGS

The above and other advantages and objects of the present invention will become more apparent from the following description, claims and drawings in which:

FIG. 1 is a perspective view of the seatbelt positioning attachment of the present invention;

FIG. 2 illustrates the attachment of FIG. 1 in an installed position with an automotive seatbelt shown in dotted line;

FIG. 3 is a side view partly in section which illustrates the installation of the positioning attachment of the present invention;

FIG. 4 is a detail view of a portion of the automotive seatbelt and the attachment portion of the harness provided with a cushioning pad;

FIG. 5 is a perspective view of an alternate embodiment of the positioning attachment in which the upper anchor portion is provided with adjustable slides;

FIG. 6 is a perspective view showing an alternate view of the present invention in an installed position with an automotive seat shown in dotted lines;

FIG. 7 is a view similar to FIG. 6 in which the attachment as shown in FIG. 6 is installed in an alternate manner on an automobile seat shown in dotted lines;

FIG. 8 is a perspective view of a representative buckle used in connection with the seatbelt receiving loop on the lower portion of the attachment of the present invention; and FIG. 8A is a view similar to FIG. 8 showing an alternate style of buckle namely a side squeeze, bayonet-style buckle.

DETAILED DESCRIPTION OF THE DRAWINGS

Turning now to the drawings, FIG. 1 represents one embodiment of the present invention which is generally designated by the numeral 10. This embodiment includes an anchor portion 12 shown as a loop for attachment to the vehicle seat and a lower anchor 14 which is adjustably securable to the lap portion of a seatbelt. The seatbelt is shown in dotted line in FIG. 2 and, as is conventional, has a lap belt (LB) and a cross body belt (CB). The strap 11 of anchor 12 is a belt of webbing material of the type conventionally used for seatbelts such as a woven nylon. The strap 11 typically is two or three inches wide and is formed in a loop 15 in which the distal end 18 is stitched or otherwise secured to the belt at 20. The end of the anchor strap forms a small loop 22 which is received in a slot in a connector 24. The opposite slot of the connector receives the distal end of strap 25 which forms the anchor portion of the positioning attachment. The distal end of strap 25 is threaded through a slot in the connector and secured to the belt at an adjustable slide 28. The strap 14 may be any suitable length and has a free end which receives a latch plate 30. The latch plate 30 may be one component or one of a conventional seatbelt buckle fastening mechanism in which the latch plate is insertable into a releasable receiver 32. This type of buckle is shown in FIG. 8, although other types may be used such as a conventional side-squeeze buckle.

The receiver portion 32 of the buckle assembly has a slide 34 which is adjustable along the length of strap 11. The receiver portion 32 of the buckle may be adjusted to adjust to the size of a loop 40 which is formed when the latch 30 of the buckle is placed in the receiver 32. The overall length of strap 14 may be adjusted by slide adjustment 28 as described above. Adjustment is to accommodate vehicle seats of various sizes and configurations.

In use, the upper anchor portion 12 may be secured to a section of the vehicle seat as shown in FIGS. 2 and 3. If the seat S is of the type having a headrest H, the anchor may be positioned over the headrest and extended downwardly against the rear of the seat backrest and further extended between the opening between the seat and backrest portions. The lower attachment portion 14 will then extend forwardly along the upper surface of the seat as shown in FIG. 2. The overall length of lower portion 14 can be adjusted as required. The buckle 32 is open so the connecting loop 40 formed at the end of the attachment portion can be secured about the lower lap seatbelt at an intermediate location. In this way, the lap seatbelt is maintained in a lower abdominal position and restrained from sliding up over the abdominal area of the user. This is best seen in FIG. 3.

FIG. 4 shows an alternate embodiment of the invention in which the vehicle seatbelt attachment is as shown in FIGS. 1, 2 and 3. In this embodiment, a cushion 50 is provided for greater protection to the user. The cushion 50 has a body 52 of a resilient material. The material may be a foam or may be a pouch defining a pocket in which a resilient cushioning material is contained. A portion of the cushion is cut-away at 55 to allow the buckle components 30 and 32 to be easily accessed. The resilient cushion is secured by a pair of tabs 56 and 56A, each of which carry one component 58 and 58A of a loop-and-hook fastener material. The mating loop-and-hook fastener material 60A is provided on the surface of the pad. The pad will help to cushion and distribute force in the event of an accident or sudden stop. The cushion further will provide greater comfort when wearing the seatbelt as localized rubbing and irritation from the seatbelt will be reduced.

In FIG. 6, an alternate embodiment of the invention is shown generally designated by the numeral 100. This embodiment, again, includes a lower attachment section 114 which has a loop 140 at its lower end which can be extended about the lap seatbelt and secured by the plate 130. The opposite end of the attachment strap 114 is secured to the anchor portion 112 by stitching at suitable location 115. The anchor strap extends transversely having opposite ends 160 and 162. Adjustable slides 128, 128A are provided at opposite sections of the anchor strap so the overall length may be adjusted.

The embodiment shown in FIG. 6 is secured to the rail supports R or beneath the seat S of the vehicle. The opposite ends of the anchor strap 112 are secured as shown and adjusted so the anchor strap extends upwardly along the side of the seat.

In FIG. 7, an alternate installation is shown in which the opposite ends of the transverse anchor strap 112 are extended downwardly along the sides of the seat and then crossed beneath the seat and secured to the opposite rails R which support the seat. The seatbelt-engaging strap 114, again, extend along the upper surface of the seat terminating at connecting loop 140 which may be secured about the lap seatbelt as described above. The seatbelt positioning attachment, as described above, will serve to maintain the cross body lower lap belt in a more comfortable position. The attachment may be secured to automobile seats or seat frames in various manners depending upon the size and construction of the seat. The attachment may be used with or without an additional resilient comfort pad of the type shown in FIG. 4.

It will be obvious to those skilled in the art to make various changes, alterations and modifications to the invention described herein. To the extent such changes, alterations and modifications do not depart from the spirit and scope of the appended claims, they are intended to be encompassed therein.

I claim:

1. A positioning attachment for use with a vehicle having a seat structure with a seat cushion, seat back and headrest, and further having a seatbelt of the type having a lap belt with belt sections which, when secured at a buckle, extends across the lap area of the seated wearer, said attachment comprising:
    (a) anchor means comprising a strap forming a loop securable about the vehicle seat headrest;
    (b) attachment means comprising a belt secured to said anchor means and extendable along the back of the seat back and forwardly along said seat cushion having a distal end located intermediate the lap of the seated wearer;
    (c) connecting means on said distal end to slidably receive said vehicle lap belt; and
    (d) adjustment means on said attachment means for positioning and maintaining said connecting means and said lap belt in a lowered position below the abdomen thereby securing the wearer in the wearer's pelvic area.

2. The positioning attachment of claim 1 wherein said connecting means comprise a loop secured by mating, releasable buckle components.

* * * * *